Sept. 16, 1958
R. B. RANSOM
2,852,108
MOTION DAMPING DEVICE
Filed Oct. 11, 1951
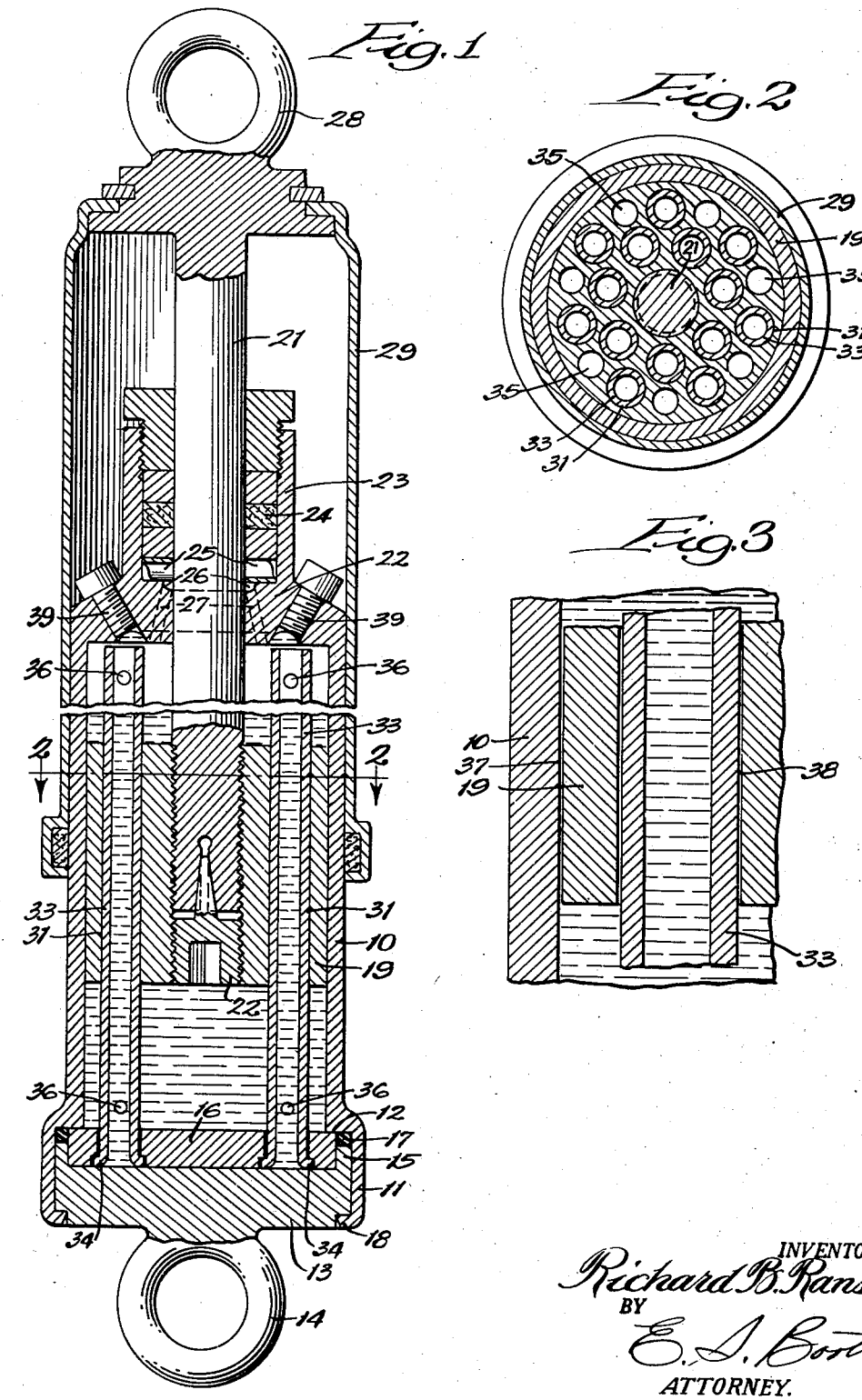
INVENTOR:
Richard B. Ransom,
BY
E. A. Borth,
ATTORNEY.

United States Patent Office 2,852,108
Patented Sept. 16, 1958

2,852,108

MOTION DAMPING DEVICE

Richard B. Ransom, South Bend, Ind.

Application October 11, 1951, Serial No. 250,916

9 Claims. (Cl. 188—88)

This invention relates to motion damping devices and more particularly to liquid filled shock absorbers for damping spring movements on vehicles and the like.

Shock absorbers, as heretofore designed for vehicle spring suspensions, have commonly depended on restricted flow of liquid through an orifice to produce the damping effect. Such devices are extremely sensitive to changes in the viscosity of the liquid, require very close tolerance in manufacture for proper operation and are apt to be disabled by accumulations of foreign material in the liquid orifices. Furthermore, due to the orifice effect, such devices offer a proportionately greater resistance to rapid movement than to slow movement, so that they can be adjusted to compensate properly for only one particular rate of spring movement.

It is accordingly one of the objects of the present invention to provide a motion damping device which does not have any orifices, which is relatively insensitive to viscosity changes in the liquid and which is simple and inexpensive to manufacture and assemble.

Another object is to provide a motion damping device in which the damping effect is produced by shearing a liquid film between two substantially smooth parallel surfaces.

Still another object is to provide a motion damping device in which a slidable plunger is formed with a series of openings to receive fixed rods and having clearance therein to provide a relatively narrow space for a liquid film which will be sheared as the plunger moves.

According to one feature of the invention the opposite sides of the plunger are connected through vent passages constructed to produce a linear pressure-velocity relationship corresponding to the relationship produced by shearing of the film.

A further object is to provide a motion damping device which can easily be assembled to maintain proper clearance between the parts without requiring extreme accuracy of manufacture.

A still further object of the invention is to provide a spring damping device in which the damping force is much more strictly proportional to the variable deflecting forces impressed on the spring than has been possible with any previous types of construction.

The above and other objects and features of the invention will be more readily apparent when read in connection with the accompanying drawings in which:

Figure 1 is an axial section through a motion damping device embodying the invention;

Figure 2 is a transverse section on the line 2—2 of Figure 1; and

Figure 3 is a greatly enlarged partial section similar to Figure 1.

The motion damping device, as illustrated, is of the linearly movable shock absorber type, such as is commonly used on automotive or other vehicles. The device comprises a cylindrical body 10 formed with a relatively smooth cylindrical inner surface and terminating at one end in an enlarged flange 11 which is joined to the body through a flat annular shoulder 12. The flange 11 receives a closure plate 13 which may be provided with a mounting ring 14 and which is formed with an edge flange 15 narrower than the shoulder 12. The closure plate receives within its edge flange 15 a mounting plate 16 which is thicker than the edge flange and which seats against the shoulder 12 as shown. A backing ring 17 such as an O-ring of rubber, synthetic rubber, or the like, is mounted in the space defined by the shoulder 12, the flange 11, the edge flange 15, and the mounting plate 16, to seal the mounting plate securely to the end of the cylinder against fluid leakage. The closure plate 13 may be securely held in place by bending or spinning over the lower edge of the flange 11, as indicated at 18.

The cylinder receives a cylindrical plunger 19 which is axially slidable in the cylinder. The plunger is connected to a plunger rod 21 which is threaded into the plunger and locked in place by a locking plug 22 having a tapered projection thereon to enter the split lower end of the plunger rod. The plunger rod passes through and is guided by a bearing formed by an upper end closure 22 for the cylinder. This closure 22 is formed with a flange 23 larger than the plunger rod to receive a packing 24 which may be constructed as more particularly described and claimed in my copending application Serial No. 250,915, filed October 11, 1951, and now abandoned. The packing includes a compression spring 25 lying adjacent to the closure 22 and the closure 22 is vented through a groove 26 and vent ports 27 so that any fluid tending to accumulate around the spring 25 and beneath the packing will be vented back into the cylinder and will not build up pressure on the packing.

The plunger rod may be formed at its end with a connecting ring 28 and preferably carries a dust cover sleeve 29 which fits slidably over the cylinder to keep dust and other foreign material away from the cylinder and the plunger rod.

The plunger 19 is formed as best seen in Figure 2 with a series of openings 31 therethrough. The openings are adapted to receive rods 33 which are preferably tubular and are fixed in the cylinder. To mount the rods 33 the mounting plate 16 is formed with a corresponding series of stepped openings whose smaller diameters are adjacent the interior of the cylinder. The tubular rods 33 are flared or flanged at their ends and the flanged portions as shown at 34 fit loosely into the larger diameter portions of the stepped openings. The normal diameter portion of the rods extend loosely through the smaller diameter portions of the stepped openings so that the rods are held against lengthwise movement but can float to a slight extent laterally. With this type of mounting, the rods can align themselves accurately with the openings 31 in the plunger without requiring an extremely high degree of manufacturing accuracy.

According to the present invention, the plunger 19 has a relatively slight clearance on the order of .004 to .010 inch with the interior wall of the cylinder 10 as indicated at 37, in Figure 3. In addition, the openings 31 through the plunger are larger than the external diameter of the rods 33 to leave a clearance of approximately the same amount around the rods 33 as indicated at 38 in Figure 3.

Since very little liquid can flow through the small spaces between the plunger and the cylinder and between the rods 33 and the bores 31 through the plunger, means must be provided for flow of liquids from one side to the other of the plunger in order that the plunger can move. A small portion of this flow may be provided through openings 36 into the tubular rods 33 on opposite sides of the plunger but the major portion of the flow is provided for by forming bores 35 through the plunger from one side to the other thereof.

The bores 35 are preferably of a length relative to their diameter such that they will produce laminar or Newtonian flow whose resistance is substantially directly proportional to velocity. For this purpose the length of the bores is made at least five times their diameter and a sufficient number of bores is provided for the necessary flow without building up a high pressure drop across the plunger even during relatively rapid movement, it being intended that the major portion of the resistance to movement shall be developed by shearing the films between the closely spaced relatively movable surfaces.

In use, the cylinder is filled through filler openings 39 to a level which will cover the piston 19 but which will leave sufficient air space to accommodate the piston rod 21 with a liquid of a character which will wet the surfaces of the cylinder, the plunger, and the rods. A preferred liquid for this apparatus is a silicone oil which may have a relatively high viscosity and whose viscosity changes very little with temperature. When a silicone oil is used the plunger is preferably die cast and the interior surfaces of the cylinder and the external surfaces of the rods are plated with chromium, zinc, cadmium, or the like which will be wetted by the silicone oil. Other satisfactory liquids include polyethylene glycol or a heavy petroleum oil. In any case, the exposed surfaces of the working parts are chosen so that they will be wetted by the liquid employed.

As the plunger moves, the liquid film which will form between the adjacent surfaces of the plunger, the cylinder and the rods will be sheared and it is this shearing effect which produces the major portion of the resistance to movement. By using the rods 33 and extremely large surface area subject to liquid film shearing can be provided in a small unit and the area desired to produce the required damping effect can easily be obtained without unduly increasing the size of the unit. In one unit in which the cylinder had a length of 8 inches and a diameter of 2 inches, the piston a length of 2 inches, seven openings 35 with a diameter of 3/16 inch and the rods 33 a diameter of 5/16 inch utilizing fourteen rods and with working clearances of approximately .006 inch, using a silicone oil, it was found that at one foot per second corresponding to the average maximum rate of movement for one inch of spring oscillation in an automobile the drag was 60 lbs., for two feet per second was 108 lbs., at four feet per second, corresponding to the average maximum rate to bottom the springs in an automobile, the drag was 200 lbs., and at 8 feet per second, corresponding to the maximum estimated rate for racing car spring oscillation, the drag was 366 lbs. It is apparent that for greater or less damping effect, the area of the working surfaces can easily be varied by providing more or less tubes and without substantially increasing the overall size. From the above data it may readily be seen that the damping forces produced are closely proportional to the forces causing the spring deflection and spring rebound, whether these forces are great or small, and that the device will efficiently damp all types of road shocks and spring rebounds rather than be capable of damping only a narrow range. Actually the damping force provided by the present device is proportional to viscosity and rate of motion and inversely proportional to spacing of the surfaces.

While it is intended that the major portion of the damping effect, on the order of 80 to 90%, shall be produced by shearing of the liquid film it is inevitable that some damping effect will be produced by the pressure differential across the plunger due to flow through the bores 35. Since these bores have a length equal to at least five times their diameter and the viscosity of the fluid is high, they will produce a true Newtonian or laminar flow whose resistance is proportional to viscosity and rate of motion. Thus flow through the bores 35 has the same resistance characteristics as the shearing action of the film rather than the square function associated with the turbulence of orifice flow so that these bores augment rather than alter the desired straight line characteristics of the unit.

Furthermore, since the plunger is always submerged in the liquid, the film between the working surfaces will never be destroyed, even though there may be some slight flow since the liquid is always replenished. The pressure developed ahead of the piston due to resistance to flow through the bores 35 assists in this respect since it maintains the liquid under pressure at the inlet ends of the clearance spaces and tends to prevent cavitation which might otherwise occur at high velocities.

While one embodiment of the invention has been shown and described in detail, it will be understood that it is illustrative only and is not intended to be a definition of the scope of the invention, reference being had for this purpose to the appended claims.

What is claimed is:

1. A motion damping device comprising an elongated cylinder, a plate at one end of the cylinder formed with a series of stepped openings having their smaller diameters at the interior of the cylinder, a series of rods extending loosely through the openings and having flanged ends lying in the larger diameter portions of the openings, a plunger slidable in the cylinder and having a series of openings therein to receive the rods, the plunger having a relatively small clearance with the cylinder and the rods, and a liquid in the cylinder covering the plunger and which will wet the surfaces of the cylinder, the plunger and the rods, the rods being able to shift in the openings in the plate to center themselves in the openings in the plunger.

2. The construction of claim 1 in which the rods are tubular and have openings in their walls on opposite sides of the plunger.

3. A motion damping device comprising an elongated cylinder having an enlarged flange at one end joining the cylinder through a flat annular shoulder, a closure plate fitting into the flange and having an axially extending edge flange narrower radially than the shoulder and mounted facing the shoulder, a mounting plate thicker axially than the edge flange fitting within the edge flange and formed with a series of stepped openings with their smaller diameters at the interior of the cylinder, an annular sealing ring fitting in the space defined by the cylinder flange, the shoulder, the mounting plate and the edge flange, a series of rods fitting loosely into the openings in the mounting plate and having flanged ends lying in the larger diameter portions of the openings, a plunger slidable in the cylinder and having a series of openings therein to receive the rods, the plunger having a clearance on the order of .004 to .010 inch with the cylinder and the rods, and a liquid in the cylinder covering the plunger and which will wet the surfaces of the cylinder, the plunger and the rods.

4. A motion damping device comprising an elongated cylinder having an enlarged flange at one end joining the cylinder through a flat annular shoulder, a closure plate fitting into the flange and having an axially extending edge flange narrower radially than the shoulder and mounted facing the shoulder, a mounting plate thicker axially than the edge flange fitting within the edge flange and formed with a series of stepped openings with their smaller diameters at the interior of the cylinder, an annular sealing ring fitting in the space defined by the cylinder flange, the shoulder, the mounting plate and the edge flange, a series of rods fitting loosely into the openings in the mounting plate and having flanged ends lying in the larger diameter portions of the openings, a plunger slidable in the cylinder and having a series of openings therein to receive the rods, the plunger having a clearance on the order of .004 to .010 inch with the cylinder and the rods, and a liquid in the cylinder covering the plunger and which will wet the surfaces of the cylinder, the plunger and the rods, the rods being hollow and having openings in their walls on opposite sides of the piston.

5. A motion damping device comprising a cylinder, a plunger slidable in the cylinder and having a series of cylindrical openings therethrough, a series of cylindrical rods in the cylinder extending through the openings and having clearance with the walls of the openings to define a thin annular space within which a liquid film can be maintained, a liquid in the cylinder submerging the plunger and which will wet the surfaces of the rods and the openings, the cylinder having flat end closures against which the ends of the rods abut loosely so that the rods are held against axial movement but can shift laterally to center themselves in the openings.

6. A motion damping device comprising a cylinder, a plunger linearly slidable in the cylinder and having a series of openings therethrough, a series of rods secured in the cylinder and extending through said openings and having continuous annular clearance with the walls thereof, and a liquid in the cylinder submerging the plunger and which will wet the surfaces of the rods and the opening walls and forming films in the annular spaces between the rods and openings, the plunger having unobstructed bores therethrough for flow of liquid from one side of the plunger to the other during plunger movement, the viscosity of the liquid and said clearance being so related that there will be substantially no flow of liquid through said clearance due to pressure, the thin annular spaces between the rods and openings being of such physical dimensions as to produce at least 80 to 90% of the resistance to movement of the plunger during relatively slow plunger movement and a major part of the resistance to movement of the plunger during maximum anticipated plunger speed due to shear of the liquid films in said spaces and the unobstructed bores being so proportioned as to produce a relatively minor part of the resistance to movement of the plunger due to flow of liquid therethrough.

7. The construction of claim 6 in which the length of the bores is at least five times their diameter.

8. A motion damping device comprising a cylinder, a plunger axially slidable in the cylinder having clearance with the walls thereof to define a thin continuous annular space and having a series of cylindrical openings therethrough, a series of cylindrical rods in the cylinder extending through the openings and having clearance with the walls of the openings to define thin continuous annular spaces within which a liquid film is maintained, a liquid in the cylinder submerging the plunger and which will wet the surfaces of the rods and the openings and forming thin annular films in said spaces, the viscosity of the liquid and the clearance between the plunger and cylinder and the rods and the openings being so related that there will be substantially no flow due to pressure through the clearance spaces and the films of liquid in said thin annular spaces will be sheared as the plunger moves in the cylinder, and means defining unobstructed passages extending from one side of the cylinder to the other which are of uniform section throughout their lengths and whose lengths are at least five times their diameters, the thin annular spaces between the plunger and cylinder and between the rods and openings being of such physical dimensions as to produce at least 80 to 90% of the resistance to movement of the plunger during relatively slow plunger movement and a major part of the resistance to movement of the plunger during maximum anticipated plunger speed due to shear of the liquid films in said spaces and the last named means being so proportioned as to produce a relatively minor part of the resistance to movement of the plunger due to flow of liquid therethrough.

9. A motion damping device comprising a cylinder, a plunger axially slidable in the cylinder and having continuous clearance between its outer wall and the inner wall of the cylinder to define a continuous thin annular space open at its opposite ends to the cylinder at opposite sides of the plunger within which a film of liquid is maintained, a viscous liquid in the cylinder which will wet the surfaces of the cylinder and the plunger and forming a film in said thin annular space, the viscosity of the liquid and the width of said annular space being so related that there will be substantially no flow due to pressure through said space and the film of liquid in said thin annular space will be sheared as the plunger moves in the cylinder, and means establishing substantially unrestricted fluid communication between opposite sides of said plunger, the thin annular space between the plunger and cylinder being of such physical dimensions as to produce at least 80 to 90% of the resistance to movement of the plunger during relatively slow plunger movement and a major part of the resistance to movement of the plunger during maximum anticipated plunger speed due to shear of the liquid film in said space and the last named means being so proportioned as to produce a relatively minor part of the resistance to movement of the plunger due to flow of liquid therethrough.

References Cited in the file of this patent

UNITED STATES PATENTS

| | | |
|---|---|---|
| 999,871 | Rector | Aug. 8, 1911 |
| 1,621,261 | Lomar | Mar. 15, 1927 |
| 1,635,284 | Lomar | July 12, 1927 |
| 1,718,175 | Nilson | June 18, 1929 |
| 1,829,451 | McNab | Oct. 27, 1931 |
| 2,301,292 | Krick | Nov. 10, 1942 |
| 2,507,182 | Young | May 9, 1950 |
| 2,512,269 | Ezbelent | June 20, 1950 |
| 2,514,136 | O'Connor | July 4, 1950 |
| 2,514,140 | O'Connor | July 4, 1950 |
| 2,615,534 | Blake | Oct. 28, 1952 |
| 2,669,325 | Raines | Feb. 16, 1954 |
| 2,719,612 | Carbon | Oct. 4, 1955 |

FOREIGN PATENTS

| | | |
|---|---|---|
| 948,067 | France | Jan. 24, 1949 |
| 968,231 | France | Apr. 12, 1950 |
| 982,643 | France | June 13, 1951 |
| 656,057 | Great Britain | Aug. 8, 1951 |

OTHER REFERENCES

"Product Engineering," pages 90–93; January 1950.